United States Patent [19]
Register et al.

[11] Patent Number: 5,515,305
[45] Date of Patent: May 7, 1996

[54] PDA HAVING CHORD KEYBOARD INPUT DEVICE AND METHOD OF PROVIDING DATA THERETO

[75] Inventors: David S. Register, Austin; Terry Parks, Blue Spring Circle, both of Tex.

[73] Assignee: Dell USA, L.P., Austin, Tex.

[21] Appl. No.: 164,594

[22] Filed: Dec. 9, 1993

[51] Int. Cl.[6] .............................. G06F 3/00; G06F 1/00
[52] U.S. Cl. ............................ 364/709.15; 364/708.1
[58] Field of Search ..................... 364/709.15, 705.01, 364/708.1; 361/680; 341/22, 26

[56] References Cited

U.S. PATENT DOCUMENTS

| | | | |
|---|---|---|---|
| 4,042,777 | 8/1977 | Bequaert et al. | 364/709.15 |
| 4,491,049 | 1/1985 | Mizuta et al. | 364/705.01 |
| 5,017,030 | 5/1991 | Crewes . | |
| 5,189,416 | 2/1993 | Estes . | |

*Primary Examiner*—Tan V. Mai
*Attorney, Agent, or Firm*—Henry N. Garrana; Mark P. Kahler; Michelle M. Turner

[57] ABSTRACT

Disclosed are a personal digital assistant ("PDA") and a method of providing data to the PDA. The PDA includes: (1) a chassis having first and second noncoplanar surfaces thereon and containing computer processing circuitry therein, (2) a visual display located on one of the first and second surfaces, the visual display coupled to the circuitry to allow the circuitry to drive the visual display and (3) a plurality of momentary keys located on both of the first and second surfaces and coupled to the circuitry, the plurality cooperating to form a chord keyboard to thereby allow multiple ones of the plurality to be depressed at a time to form a chord, the circuitry interpreting the chord as a single keystroke.

50 Claims, 3 Drawing Sheets

PDA HAVING CHORD KEYBOARD INPUT DEVICE AND METHOD OF PROVIDING DATA THERETO

TECHNICAL FIELD OF THE INVENTION

The present invention is directed, in general, to computer apparatus and, more specifically, to a chord keyboard for a personal digital assistant ("PDA"), the chord keyboard allowing rapid entry of data into the PDA.

BACKGROUND OF THE INVENTION

As personal computers have increased in power and decreased in size, portable computers have become more useful and powerful. Initially, "portable" computers were essentially ruggedized desktop computers, requiring use of a desk top and access to household current. Eventually, battery-powered portable computers commonly featuring a liquid crystal display ("LCD") and weighing 10 to 20 pounds allowed true freedom for the computer user. Notebook computers weighing from 4 to 10 pounds and having a length and width approximating that of notebook paper offered an increased degree of portability, without substantially sacrificing desktop computer power.

Since the advent of the notebook computer, even smaller computers have been tested in the marketplace. However, these smaller units have not generally enjoyed much success, primarily due to limitations their size places on their input/output ("I/O") devices. In particular, computer users wish to have a visual display that is as large as possible to display data either in greater quantity or with greater clarity. In addition, the size of a human hand dictates that a keyboard for manual data entry must be of a certain minimum size for comfort, speed and accuracy of the data entry. Computers smaller than notebook computers have had to sacrifice both in display and keyboard size, resulting in their being unable to duplicate desktop computer capability, even though their data processing and storage capacity is equivalent.

One smaller-than-notebook computer design, however, has proven useful and quite popular. So-called personal digital assistants ("PDA"s), such as Newton® by Apple Computer, Inc., comprise a generally-rectangular chassis having a front surface thereon. The front surface is typically dominated by an LCD visual display. In contrast to most other computer designs, a PDA does not contain a traditional "QWERTY" or other-style keyboard. Instead, PDAs are equipped with a few control buttons on the front surface and a stylus. A user wishing to enter data to the PDA must use the stylus to write on the display. Depending on the user's preferences, the PDA can store the user's writing as a bitmapped picture, requiring substantial memory to store and limiting the PDA's ability to manipulate the writing. Alternatively, with the aid of handwriting recognition software stored in the PDA, the PDA can translate the writing into representative codes or characters suitable for more efficient processing and storage by the PDA. The stylus and/or the few control buttons on the front surface can also be used to move a pointer around the display to point at portions of a representation of a traditional keyboard shown on the screen. This also allows for entry of codes or characters.

Unfortunately, such code or character entry is markedly slower and more tedious than entry by way of a traditional keyboard. However, given their diminutive size, PDAs are not of large enough to be fitted with a keyboard suitable for use by human hands.

Accordingly, what is needed in the art is an improved PDA that is equipped with a more effective and efficient means by which to enter character or text-based data.

SUMMARY OF THE INVENTION

To address the above-discussed deficiencies of the prior art, it is a primary object of the present invention to provide a keyboard for a PDA having keys of sufficient size to allow human digits to depress the keys rapidly and accurately.

Accordingly, in the attainment of the primary object, the present invention provides both a PDA and a corresponding method of providing text-based character data to the PDA. The PDA comprises: (1) a chassis having first and second noncoplanar surfaces thereon and containing computer processing circuitry therein, (2) a visual display located on one of the first and second surfaces, the visual display coupled to the circuitry to allow the circuitry to drive the visual display and (3) a plurality of keys located on both of the first and second surfaces and coupled to the circuitry, the plurality cooperating to form a chord keyboard to thereby allow multiple ones of the plurality to be depressed at a time to form a chord, the circuitry interpreting the chord as a single keystroke.

The advantage of the above-described structure is that a chord keyboard allows entry of a number of characters that is substantially greater than the number of keys in the chord keyboard. With traditional keyboards, each key represents a character: one depresses a "Q" key to enter a "Q." Thus, a keyboard having 50 keys can generate some 50 different characters, roughly a one-to-one correspondence. Often, control or special function keys can be used in combination with other keys to yield more than one character or code per key. However, with a traditional, non-chord keyboard, most keystrokes are single-key keystrokes. Given the variety of characters users want to have at hand, today's standard personal computer ("PC") keyboards have 101 keys.

In contrast, at least the majority of keystrokes on a chord keyboard involve depressing multiple keys at once. Thus, a chord keyboard can, in theory, accommodate the entry of 256 unique characters with only 8 keys. Because there are fewer keys, the keys can be made larger.

In a preferred embodiment, the chord keyboard is located on a rear surface of the chassis (the "first surface" as recited above). In a more specific embodiment, the chord keyboard consists of 8 momentary keys arranged in first and second columns, one on each side of the rear surface of the PDA chassis.

A momentary "send" key is located on a front surface (the "second surface"). This allows a user to provide input data to the PDA by grasping the PDA with both hands, respective fingers of both of the hands able to depress respective ones of the columns of the plurality of momentary keys to produce the chord, a thumb of one of the hands able to depress the momentary "send" key. Depression of the "send" key generates an interrupt to the microprocessor CPU to cause the microprocessor CPU to determine the state of the plurality of momentary keys. Once the microprocessor CPU determines the state, it may employ a lookup table stored in storage circuitry to translate the chord into a character. The visual display then displays the character to the user.

In one embodiment of the present invention, the plurality of momentary keys, and perhaps the "send" key, are recessed in indentations in the rear surface of the chassis. This aids the user in aligning fingers with keys, providing an ergonomically-advantageous configuration.

The foregoing has outlined rather broadly the features and technical advantages of the present invention so that the detailed description of the invention that follows may be better understood. Additional features and advantages of the invention will be described hereinafter which form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
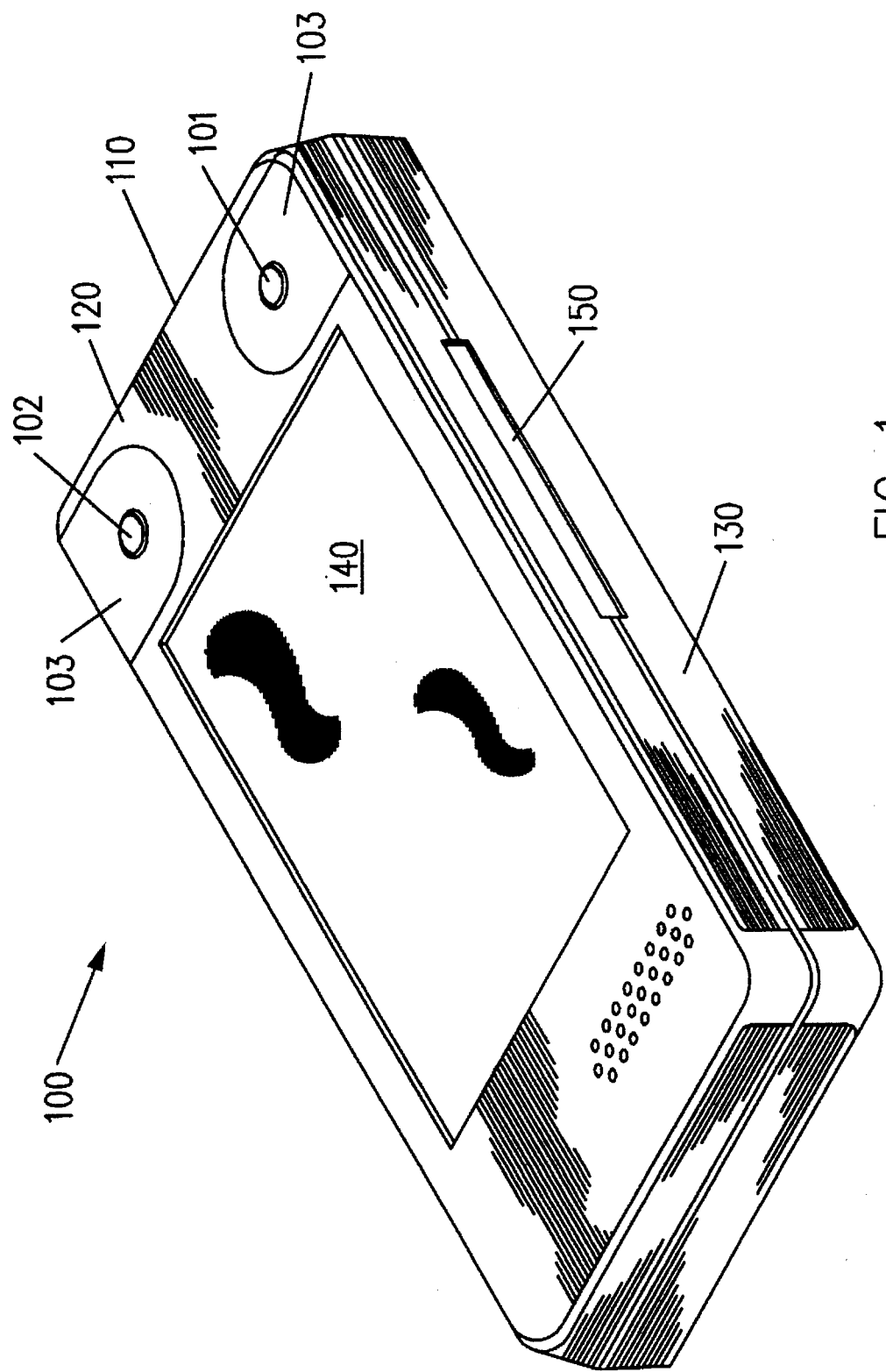
FIG. 1 illustrates a front isometric view of the PDA of the present invention.

With initial reference to FIG. 1, illustrated is a front isometric view of the PDA of the present invention. The PDA, generally referenced as 100, comprises a chassis 110 having a front surface 120 and a rear surface 130. A visual display 140 dominates the front surface 120. The visual display 140 is typically a liquid crystal display ("LCD") configured to allow display of an array of dots or pixels. In this configuration, the visual display 140 can display either text or graphics images. Processing, storage and video controller circuitry (not shown in FIG. 1) within the chassis 110 dictates the data that the visual display 140 presents to a user.

The PDA 100 may optionally be equipped with a Personal Computer Memory Card International Association ("PCMCIA") slot 150 on an edge of the chassis 110 thereof to allow peripheral devices to be removably coupled to the PDA 100. Such devices may include additional volatile or nonvolatile memory, a modem, a network interface.

The PDA 100 may also be equipped with a bus or port connector to allow proprietary peripheral devices, such as a printer, to be coupled to the PDA 100. The connector is not shown because it is typically located on a top edge of the chassis 110 not visible in FIG. 1.

PDAs may employ the visual display 140 as an input device, too. Such PDAs provide a stylus or pen device for a user to make impressions on selected portions of the visual display 140. A user can employ the stylus to apply pressure to a portion of the display 140 showing, for example, an icon. This directs the PDA 100 to perform an action in response thereto.

Some PDAs provide an icon representing a keyboard on the visual display 140. When the user presses the stylus on the icon, the PDA 100 is directed to present an image of a standard QWERTY keyboard on the visual display 140. The user is then free to enter textual character or code-based data by pressing portions of the visual display 140 corresponding to various keyboard "keys" displayed. Unfortunately, as previously described, this stylus-based entry method is slow and tedious, limiting the amount of data a user can provide to the PDA 100 per unit.

Figure 2:
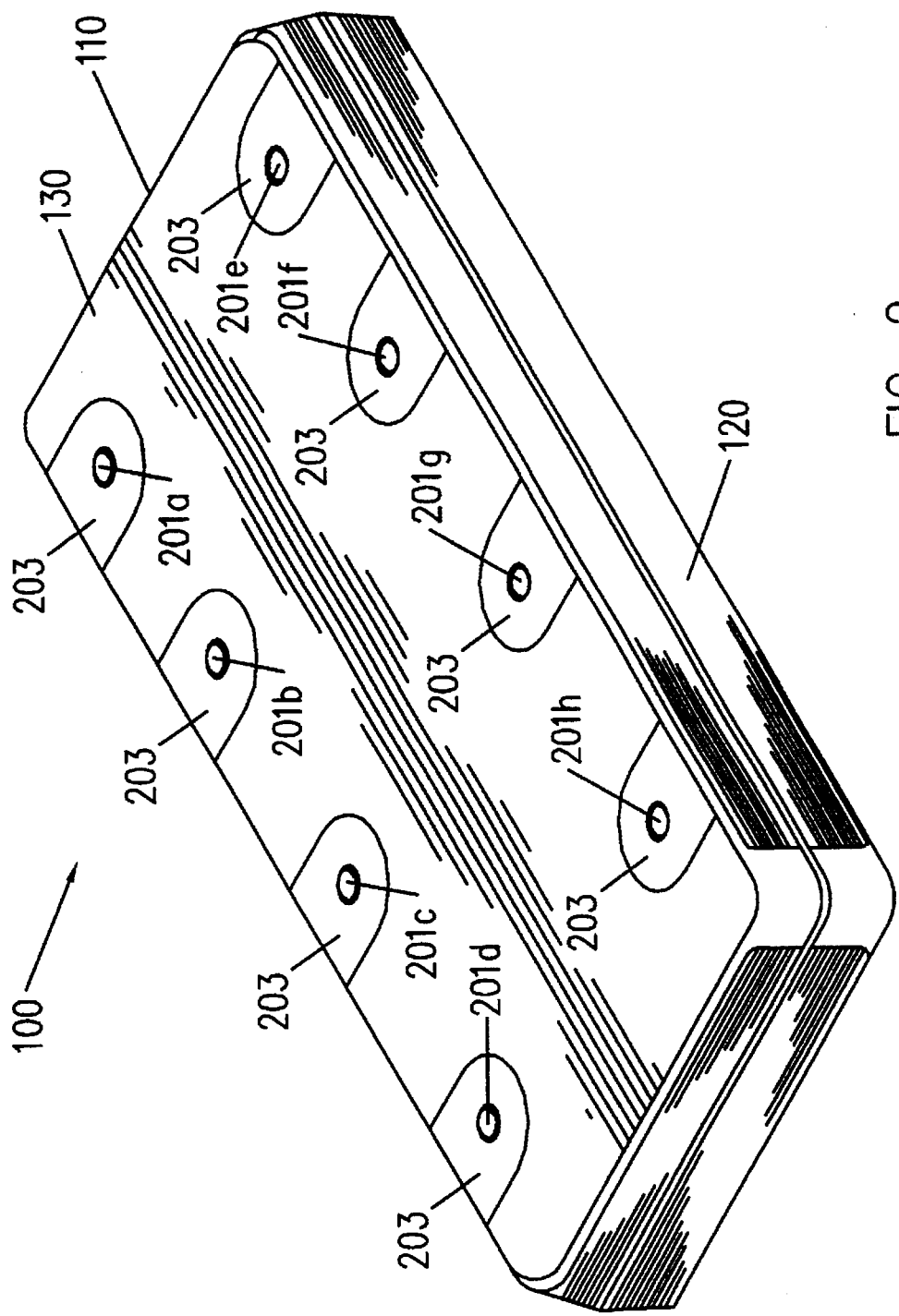
FIG. 2 illustrates a rear isometric view of the PDA of FIG. 1.

Turning now to FIG. 2, illustrated is a rear isometric view of the PDA 100 of FIG. 1. A plurality of switches or keys 201a, 201b, 201c, 201d, 201e, 201f, 201g, 201h are located on the rear surface 130 of the chassis 110. The keys 201a–h are preferably of the momentary type, closing a circuit when depressed and having a bias toward a non-depressed, open position. The keys 201a–h cooperate to form a chord keyboard. As discussed previously, a chord keyboard yields a single character when one or more than one key is depressed at a time (a "chord"). Thus, in contrast to traditional keyboards wherein single-key keystrokes predominate, operation of a chord keyboard is characterized by performing multiple-key keystrokes.

The chord keyboard of the present invention preferably comprises 8 keys, arranged in first and second columns of 4 keys in each column, as shown in FIG. 2. If all possible combinations of key-strikes are allowed and enabled, an 8 key chord keyboard can produce 256 different codes or characters. This is considerably more than a typical 101 key IBM compatible keyboard can produce (absent use of alternate function keys).

The keys 201a–h are arranged in two columns and are located on the rear surface 130 to allow a pair of human hand to grasp the PDA 100, the front surface 120 of the PDA 100 facing the user. Held in this manner, the user's fingers rest on the rear surface 130 and the user's thumbs rest on the front surface 120. The 8 keys 201a–h therefore correspond one-to-one to respective fingers of each of the user's hands, allowing each finger to contact each key 201a–h. Thus, when a user wishes to enter a keystroke, the user need only press a certain combination of the keys 201a–h.

One problem with chord keyboards is that the keys 201a–h are rarely pressed simultaneously. It is imperative that the PDA 100 be able to recognize when a complete chord has been pressed. To this end, the PDA 100 of the present invention may be equipped with sophisticated software that measures the time each key is struck, perhaps providing a window of time within which all keys desired to be included in a particular chord must be pressed.

Turning back to FIG. 1, shown is an alternative way of providing the PDA 100 with an indication that a complete chord is present. Shown in FIG. 1 is a "send" key 101 located on the front surface 120 of the chassis 110. The "send" key 101 is positioned so as to receive a thumb of one of the user's hands. FIG. 1 shows the "send" key 101 to be on the right-hand side of the chassis 110. An alternative "send" key 102, located on the left-hand side of the chassis 110 is positioned to receive the thumb of the user's left hand, and can be software or hardware configurable to substitute for the "send" key 101. The key not used as a "send" key may be used for a different purpose, or may be a joystick or pointing key, rather than a momentary switch, allowing the user to move a pointer about the visual display 140 as a function of a position of the joystick or pointing key. As will be described more thoroughly in conjunction with FIG. 3, depression of the "send" key 101 causes a signal, perhaps an interrupt signal, to be sent to processing circuitry within the chassis 110. The circuitry responds by scanning or latching the state of the 8 keys 201a–h to determine which have been depressed.

One alternative embodiment of the present invention devotes a small portion of the visual display 140 to showing a character or code representing the current state of the chord keyboard, even though the user has not yet pressed the "send" key 101 (an "inchoate" character). Thus, the user may refer to the visual display 140 prior to pressing the "send" key 101 to determine whether the chord corresponds to the character the user intends to transmit to the PDA 100. Alternatively, the visual display 140 may not display inchoate characters. This may be more desirable for advanced users. Whether or not the visual display 140 shows inchoate characters is software selectable.

FIGS. 1 and 2 show the keys 101, 102, 201*a–h* to be recessed in indentations 103, 203 in the chassis front and rear surfaces 120, 130. This provides an ergonomically desirable detent or natural resting place for the various digits (fingers and thumb) of the user. The indentations 103, 203 further provide a positive engaging surface for the digits to counteract shear forces, preventing the PDA 100 from sliding laterally as the keyboard is used.

Figure 3:
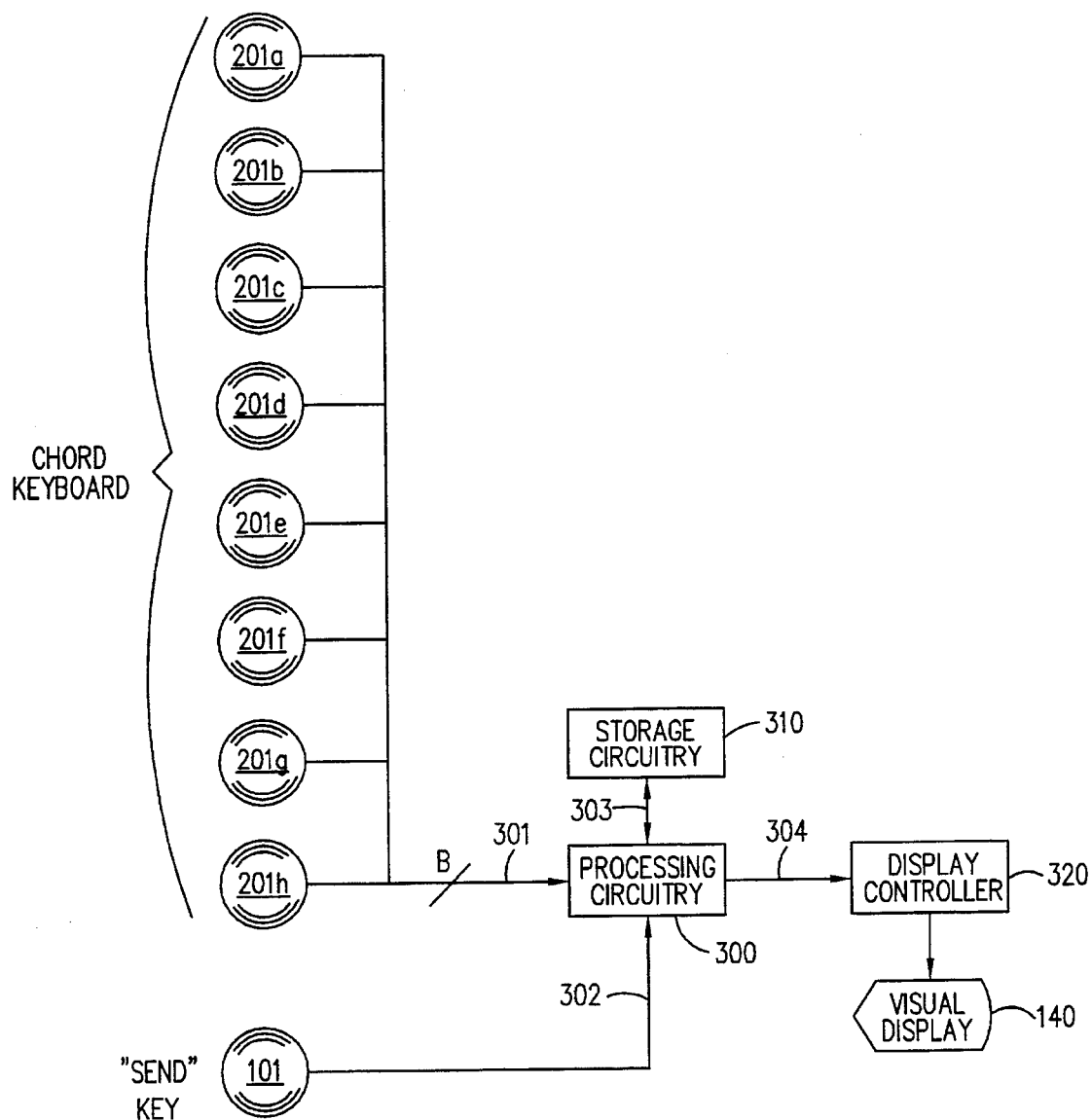
FIG. 3 illustrates a block diagram of computer processing and storage circuitry contained within the PDA of FIG. 1.

Turning now to FIG. 3, illustrated is a block diagram of computer processing and storage circuitry contained within the PDA 100 of FIG. 1. Shown are the keys 201*a–h* comprising the chord keyboard and preferably located on the rear surface 130 of the PDA chassis 110. The keys 201*a–h* are coupled to processing circuitry 300 via a chord keyboard data bus 301. The data bus 301 preferably comprises a data line for each key 201*a–h*, allowing the processing circuitry 300 to determine the state of each key 201*a–h* at a given point in time, that is, whether each key 201*a–h* is depressed or not. The "send" key 101 is likewise coupled to the processing circuitry 300 via a line 302.

In the illustrated embodiment, the processing circuitry 300 comprises a microprocessor CPU and associated support circuitry. The data bus 301 is coupled to a port or a data bus input on the microprocessor CPU, allowing the microprocessor CPU to determine the state of the chord keyboard. The line 302 is preferably coupled to an interrupt pin on the microprocessor CPU, allowing the "send" key 101 to generate an interrupt to the microprocessor CPU when the "send" key 101 is depressed. In response to an interrupt signal from the "send" key 101, the microprocessor CPU reads the state of the chord keyboard.

Storage circuitry 310, perhaps comprising both read-only memory ("ROM") and random access memory ("RAM") is coupled to the processing circuitry 300 via a data and address bus 303, allowing the processing circuitry to communicate with the storage circuitry 310. In the illustrated embodiment, the storage circuitry contains a lookup table comprising two columns. A first column contains numbers corresponding to defined chords. If the keys 201*a–h* are tied to successive lines in the data bus 301 such that each key is assigned a value representing a successively greater power of 2, then each chord yields a unique number equalling the sum of each depressed key value. For purposes of this discussion, key 201*a* is assigned a value of 1, key 201*b* is assigned a value of 2, key 201*c* is assigned a value of 4, key 201*d* is assigned a value of 8, key 201*e* is assigned a value of 16, key 201*f* is assigned a value of 32, key 201*g* is assigned a value of 64 and key 201*h* is assigned a value of 128. A second column of the lookup table contains corresponding characters or codes that each chord represents. The lookup table therefore provides a means by which to program the chord keyboard.

For instance, if a user wishes to enter the letter "A," and the letter "A" is defined as a chord requiring depression of keys 201*a*, 201*e* and 201*h*, then the user need only depress the keys 201*a*, 201*e*, 201*h* and the "send" key 101. The microprocessor CPU receives the interrupt generated by depression of the "send" key 101 and determines the state of the keyboard. In this example, the keyboard yields the number "145." The microprocessor CPU translates the chord into a character by looking up the value "145" in the first column of the lookup table. Next to "145" in the second column is the character "A." The microprocessor CPU displays the character "A" on the visual display 140 by transmitting the character to a video controller 320, coupled via a data bus 304.

As discussed previously, the PDA of the present invention can be programmed to display inchoate characters on the visual display 140. In such a configuration, the microprocessor CPU periodically determines the state of the chord keyboard, displaying a character representing the state on a portion of the visual display 140. When the user presses the "send" key 101, the microprocessor CPU treats the chord then present as a character to be entered and stored.

Since the lookup table is flexible, more often-used characters such as vowels can be assigned chords requiring depression of a fewer number of keys, and perhaps only a single key. Lesser-used characters, including control codes, may require chords requiring depression of more keys. The present invention does not require a particular correspondence in the lookup table.

Those skilled in the art will recognize that the present invention is also useful in conjunction with PDAs or palmtop computers that fold in half for storage. In such PDAs or palmtops, the "second" or "front" surface still contains both the visual display and some of the keys required for a chord keyboard (namely the "send" key), however, the "second" or "front" surface may not always be planar, as the surface is hinged to fold. Likewise, in such PDAs or palmtops, the chord keyboard still resides on a "first" or "rear" surface, but the configuration of the PDA allows the surface to be nonplanar.

From the above description, it is apparent that the present invention provides a PDA comprising: (1) a chassis having first and second noncoplanar surfaces thereon and containing computer processing circuitry therein, (2) a visual display located on one of the first and second surfaces, the visual display coupled to the circuitry to allow the circuitry to drive the visual display and (3) a plurality of momentary keys located on both of the first and second surfaces and coupled to the circuitry, the plurality cooperating to form a chord keyboard to thereby allow multiple ones of the plurality to be depressed at a time to form a chord, the circuitry interpreting the chord as a single keystroke.

Although the present invention and its advantages have been described in detail, it should be understood that various changes, substitutions and alterations can be made herein without departing from the spirit and scope of the invention as defined by the appended claims. For example, key chording may be interpreted by the processing circuitry 300 based on a time interval between keystrokes, or a time interval for which a group of keys are depressed, rather than requiring a "send" signal 301 from the send key 101 to designate that a particular chord has been selected.

What is claimed is:

1. A hand-held personal digital assistant (PDA), comprising:

a chassis having first and second noncoplanar surfaces thereon and containing computer processing circuitry therein;

a visual display located on one of said first and second surfaces, said visual display coupled to said circuitry to allow said circuitry to drive said visual display; and a plurality of keys located on both of said first and second surfaces and coupled to said circuitry, said plurality of keys cooperating to form a chord keyboard to thereby allow multiple ones of said plurality of keys to be depressed at a time to form a chord, said circuitry interpreting said chord as a single keystroke.

2. The PDA as recited in claim 1 wherein said processing circuitry includes a microprocessor central processing unit (CPU) and associated storage circuitry.

3. The PDA as recited in claim 1 wherein ones of said plurality of keys are arranged in a pair of columns on said first surface and said visual display and another of said plurality of keys is located on said second surface.

4. The PDA as recited in claim 1 wherein depression of one of said plurality of keys issues an interrupt to a microprocessor central processing unit (CPU) within said chassis, said microprocessor CPU translating said chord into a character.

5. The PDA as recited in claim 1 wherein said plurality of keys comprise 8 momentary keys arranged in 2 columns of 4 keys per column on said first surface of said chassis.

6. The PDA as recited in claim 1 wherein said circuitry causes a character to be displayed on said visual display as a function of said chord.

7. The PDA as recited in claim 1 wherein some of said plurality of keys are arranged in a pair of columns on said first surface of said chassis, said some of said plurality of keys adapted to receive pressure from human digits of a corresponding pair of hands of a user.

8. The PDA as recited in claim 1 wherein said plurality of keys are recessed in indentations in said first surface of said chassis.

9. The PDA as recited in claim 1 wherein one of said plurality of keys is located on said second surface of said chassis, said one of said plurality of keys adapted to receive pressure from a human digit of a hand of a user.

10. The PDA as recited in claim 1 wherein said circuitry employs a lookup table in storage circuitry to translate said chord into a character.

11. A method of providing data to a personal digital assistant (PDA), comprising the steps of:

depressing ones of a plurality of keys on a first surface of a chassis of said PDA, said plurality of keys cooperating to form a chord keyboard, said ones of said plurality of keys capable of being depressed to produce a chord representing a single keystroke;

translating said state as a single keystroke, a visual display located on said second surface of said chassis coupled to said processing circuitry and capable of displaying a character representing said single keystroke.

12. The method as recited in claim 11 further comprising the step of depressing a momentary "send" key on a second surface of said chassis, said second surface noncoplanar with respect to said first surface, said step of depressing said "send" key a microprocessor central processing unit (CPU) and associated storage circuitry within said chassis to determine said state of said plurality of keys.

13. The method as recited in claim 11 wherein ones of said plurality of keys are arranged in a pair of columns on said first surface.

14. The method as recited in claim 11 further comprising said step of issuing an interrupt to a microprocessor central processing unit (CPU) within said chassis, said microprocessor CPU translating said chord into a character.

15. The method as recited in claim 11 wherein said plurality of keys comprise 8 momentary keys arranged in 2 columns of 4 keys per column on said first surface of said chassis.

16. The method as recited in claim 11 further comprising the step of displaying said character on said visual display.

17. The method as recited in claim 11 wherein said steps of depressing each comprise the step of placing pressure on ones of said plurality of keys from human digits of a corresponding pair of hands of a user.

18. The method as recited in claim 11 wherein said plurality of keys are recessed in indentations in said first surface of said chassis.

19. The method as recited in claim 11 wherein said "send" key is adapted to receive pressure from a human digit of a hand of a user.

20. The method as recited in claim 11 further comprising the step of employing a lookup table in storage circuitry associated with said processing circuitry to translate said chord into a character.

21. A personal digital assistant (PDA), comprising:

a chassis having front and rear surfaces thereon and containing computer processing and storage circuitry including a circuit capable of receiving and interpreting keystrokes provided to said PDA;

a visual display located on said front surface and coupled to said processing and storage circuitry to allow said visual display to display data provided via said keystrokes; and a plurality of keys located on both said front and rear surfaces, said plurality of keys cooperating to form a chord keyboard, multiple ones of said plurality of keys depressible to indicate one of said keystrokes.

22. The PDA as recited in claim 21 wherein said processing circuitry includes a microprocessor central processing unit (CPU).

23. The PDA as recited in claim 21 wherein ones of said plurality of keys are arranged in a pair of columns on said rear surface and another of said plurality of keys is located on said front surface.

24. The PDA as recited in claim 21 wherein depression of one of said plurality of keys issues an interrupt to a microprocessor central processing unit (CPU) within said chassis, said microprocessor CPU translating said one of said keystrokes into a character.

25. The PDA as recited in claim 21 wherein said plurality of keys comprise 8 momentary keys arranged in 2 columns of 4 keys per column on said rear surface of said chassis.

26. The PDA as recited in claim 21 wherein said circuitry causes a character to be displayed on said visual display as a function of said one of said keystrokes.

27. The PDA as recited in claim 21 wherein some of said plurality of keys are arranged in a pair of columns on said rear surface of said chassis, said some of said plurality of keys adapted to receive pressure from human digits of a corresponding pair of hands of a user.

28. The PDA as recited in claim 21 wherein said plurality of keys are recessed in indentations in said rear surface of said chassis.

29. The PDA as recited in claim 21 wherein "send" key is adapted to receive pressure from a thumb of a hand of a user.

30. The PDA as recited in claim 21 wherein said circuitry employs a lookup table in storage circuitry to translate said one of said keystrokes into a character.

31. A method of providing data to a personal digital assistant (PDA), comprising the steps of:

depressing ones of a plurality of keys on a rear surface of a chassis of said PDA, said plurality of keys cooperating to form a chord keyboard, said step of depressing said ones producing a chord representing a single keystroke;

depressing a momentary "send" key on a front surface of said chassis, said step of depressing said "send" key causing processing circuitry within said chassis to determine a state of said plurality of keys; and interpreting said state as a single keystroke by means of storage circuitry located in said chassis, a visual display located on said front surface of said chassis coupled to said processing circuitry and capable of displaying data provided by said single keystroke.

32. The method as recited in claim 31 wherein said step of depressing said "send" key causes a microprocessor central processing unit (CPU) within said chassis to determine said state of said plurality of keys.

33. The method as recited in claim 31 wherein ones of said plurality of keys are arranged in a pair of columns on said rear surface.

34. The method as recited in claim 31 wherein said step of depressing said momentary "send" key comprises the step of issuing an interrupt to a microprocessor central processing unit (CPU) within said chassis.

35. The method as recited in claim 31 wherein said plurality of keys comprise 8 momentary keys arranged in 2 columns of 4 keys per column on said rear surface of said chassis.

36. The method as recited in claim 31 further comprising the step of displaying said data provided by said single keystroke on said visual display.

37. The method as recited in claim 31 wherein said step of depressing said plurality of keys comprises the step of placing pressure on ones of said plurality of keys from fingers of a corresponding pair of hands of a user.

38. The method as recited in claim 31 wherein said plurality of keys are recessed in indentations in said first surface of said chassis.

39. The method as recited in claim 31 wherein said "send" key is adapted to receive pressure from a thumb of a hand of a user.

40. The method as recited in claim 31 wherein said step of interpreting comprises the step of employing a lookup table in said storage circuitry to translate said chord into a character.

41. A personal digital assistant (PDA), comprising:

a chassis having generally rectangular front and rear surfaces thereof and containing a microprocessor central processing unit (CPU) and associated memory and video controller circuitry;

a visual display located on said front surface, coupled to said video controller circuitry and capable of displaying data provided by said microprocessor CPU;

a plurality of momentary keys arranged in first and second columns on said rear surface of said chassis, said plurality of momentary keys cooperating to form a chord keyboard, multiple ones of said plurality of momentary keys depressible to generate a chord representing a single keystroke; and a momentary "send" key located on said front surface and capable of generating an interrupt signal to said microprocessor when said "send" key is depressed, said microprocessor CPU determining a state of said plurality of momentary keys when said "send" key is depressed, said visual display capable of displaying said single keystroke as a character to thereby allow a user to provide input data to said PDA by grasping said PDA with both hands, respective fingers of both of said hands able to depress respective ones of said columns of said plurality of momentary keys to produce said chord, a thumb of one of said hands able to depress said momentary "send" key to cause said microprocessor CPU to determine said state of said plurality of momentary keys.

42. The PDA as recited in claim 41 wherein said first and second columns each consist of 4 momentary keys, said 4 momentary keys corresponding to 4 fingers of each of said hands.

43. The PDA as recited in claim 41 wherein said plurality of momentary keys are recessed in indentations in said rear surface of said chassis.

44. The PDA as recited in claim 41 wherein a single one of said plurality of momentary keys is depressible to form said chord.

45. The PDA as recited in claim 41 wherein said visual display is capable of functioning as an input device to said PDA.

46. A method of providing data to a personal digital assistant (PDA), comprising the steps of:

grasping a chassis of said PDA with both hands of a user, said chassis having generally rectangular opposing from and rear surfaces, said front surface facing said user;

contacting a plurality of momentary keys arranged in first and second columns on said rear surface with respective ones of fingers of said both hands, ones of said plurality of momentary keys capable of being depressed in combination by respective ones of said fingers to yield a single keystroke;

contacting a momentary "send" key located on an upper portion of said front surface with a thumb of one of said hands, said "send" key capable of being depressed by said thumb to generate an interrupt signal to a microprocessor central processing unit (CPU) in said chassis;

determining a state of said plurality of momentary keys with said microprocessor CPU;

translating said state into a representative character with an associated memory unit; and displaying said character on a visual display located on said front surface of said chassis and coupled to said microprocessor CPU.

47. The method as recited in claim 46 wherein said first and second columns each consist of 4 momentary keys, said 4 momentary keys corresponding to 4 fingers of each of said hands.

48. The method as recited in claim 46 wherein said plurality of momentary keys are recessed in indentations in said rear surface of said chassis.

49. The method as recited in claim 46 wherein said step of contacting said plurality of momentary keys comprises the step of contacting a single one of said plurality of momentary keys.

50. The method as recited in claim 46 further comprising the step of providing data to said PDA via said visual display, said visual display thereby functioning as an input device.

* * * * *